M. J. NUSIM.
CONSTANT VOLUME REGULATOR FOR TURBOCOMPRESSORS.
APPLICATION FILED FEB. 19, 1921.
1,408,710.
Patented Mar. 7, 1922.
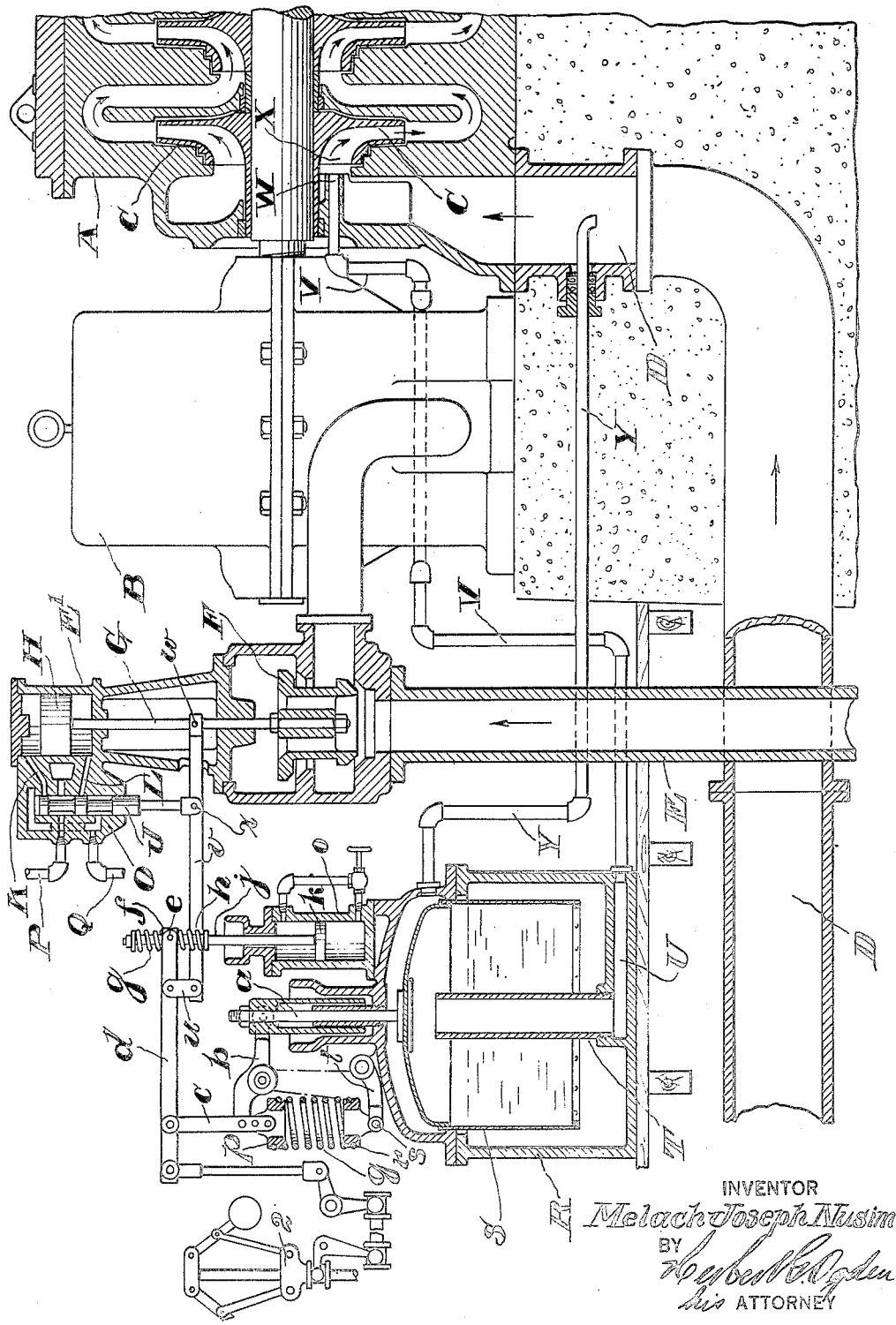
INVENTOR
Melach Joseph Nusim.
BY
his ATTORNEY

UNITED STATES PATENT OFFICE.

MELACH JOSEPH NUSIM, OF EASTON, PENNSYLVANIA, ASSIGNOR TO INGERSOLL-RAND COMPANY, OF JERSEY CITY, NEW JERSEY, A CORPORATION OF NEW JERSEY.

CONSTANT-VOLUME REGULATOR FOR TURBOCOMPRESSORS.

1,408,710. Specification of Letters Patent. Patented Mar. 7, 1922.

Application filed February 19, 1921. Serial No. 446,366.

*To all whom it may concern:*

Be it known that I, MELACH JOSEPH NUSIM, a citizen of the United States, a resident of Easton, county of Northampton, State of Pennsylvania, have invented a certain Constant-Volume Regulator for Turbocompressors, of which the following is a specification.

This invention relates to a constant volume regulator for a motor driven turbo-compressor, for insuring the delivery of a constant quantity of fluid against varying pressures.

In a regulator of this type, movable regulating means, which may conveniently be in the form of a bell shaped float, are operatively connected to control the power delivered to the motor, and the float is subjected to differential pressures inside and out from suitable sources.

The objects of the present invention are to enable such a movable regulating member, which may be a float, to be actuated for regulating purposes in a simple manner by fluctuations in the difference in pressure existing between two points in the intake of the compressor, at least one of which points, and preferably both, are within the compressor casing.

By connecting the two sides, or the inside and the outside of the movable regulating member directly to the portion of the intake within the compressor casing, the regulating apparatus is simplified and cheapened, Venturi meters and other velocity and pressure devices are eliminated, and no material change is required in existing installations in order to adapt my regulator thereto.

To these and other ends which will hereinafter appear, the invention consists of the features of construction and combinations of elements substantially as hereinafter fully described and claimed in this specification and shown in the accompanying drawing, which is a diagrammatic longitudinal sectional elevation of regulating apparatus embodying the invention.

Referring to the drawings, only so much of a turbo-compressor A is shown in vertical section as will serve to illustrate the invention. The turbo-compressor A is adapted to be driven by a suitable motor which may be in the form of a steam turbine B, the speed of which is regulated by my improved volume regulator.

The turbo-compressor is provided with the usual impellers C and the air intake D within the casing is indicated in the usual location.

Steam is supplied to the motor B through the supply pipe E and controlled by the steam admission valve F having the valve stem G provided with the piston H in the cylinder E' for actuating the admission valve although any other suitable devices may be used for this purpose. The operation of the valve piston H is controlled by a pilot valve J controlling the passages K and L in the valve casing O, fluid under pressure, as for instance oil, being supplied to the valve casing from the pipe P and discharged from the pipe Q.

The regulator comprises a receptacle R having a bell shaped float S adapted to rise and fall due to fluctuations in the pressure difference between the inside and the outside of the float, and the movement of the float actuates the pilot valve J through the agency of suitable operative connections to be described.

A tube T connects the space inside the float with a conduit U in the bottom of the receptacle, which conduit as shown, is connected by a pipe V to a point W in the inlet or annulus X of the impeller C of the turbo-compressor. The intake at the annulus X is relatively restricted in section compared to the diameter of the intake D within the casing of the compressor at a greater distance from the longitudinal axis of the machine and near the periphery or base of the casing. The velocity of the incoming fluid will be increased at the annulus X over that of the fluid in the full diametered portion D of the intake so that the static pressure of the fluid at the annulus X will be less than that at the portion D of the intake. The portion of the receptacle R above the float S as shown is connected by the pipe Y with the full diametered portion of the intake D and by means of the connections described the float S is subjected to differential pressures.

A rod *a* connected to the float S is also connected through a bell crank *b* and link *c* to a balancing lever *d* pivoted at *e* to a sleeve $f$ slidably held between cushioning springs $g$ and $h$ upon the stem $j$ of the piston $k$ of a dash-pot $o$ of usual construction. The link $c$ is shown adjustably connected to a cap $p$ carrying a compression spring $q$ which is also connected to the cap $r$ pivoted at $s$ to the arm $t$. The spring $q$ is adapted to resist the thrust of the balancing lever $d$.

The balancing lever $d$ is connected by a link $u$ to a pilot lever $v$ pivoted at $w$ on the steam admission valve stem G. The pilot valve J is pivoted at $x$ to the said pilot lever $v$.

In the operation of the apparatus, let it be assumed that the turbo-compressor is supplying air to a blast furnace and that the resistance in the discharge line of the compressor varies. Upon an increase of resistance, the pressure of the turbo-compressor must be increased in order to maintain a constant flow, hence the speed of the compressor must be increased, and upon a decrease of resistance, the speed should be lowered. When the resistance in the discharge line increases, the velocity of the fluid at the annulus X of the compressor decreases momentarily thus decreasing the pressure difference between the inside and the outside of the float, forcing the float upwardly, which pulls the balancing lever $d$ downwardly thus pulling the pilot valve J downwardly and admitting fluid pressure beneath the admission valve piston H which forces the piston upwardly thus further opening the steam admission valve and supplying more power to the motor, thus the desired constant flow of fluid is maintained with the higher pressure required to overcome the resistance. Upon a decrease of resistance in the discharge line of the compressor, the velocity of the fluid at the annulus X is momentarily increased thus increasing the suction and causing the float S to move downwardly in which case the pilot valve J is forced upwardly and fluid pressure is supplied above the admission valve piston H so that the admission valve is further closed, supplying less power to the motor to suit the constant flow of fluid at the lower pressure. A centrifugal speed governor 2 may be suitably connected to the engine and to the balancing lever $d$ for additionally regulating the speed of the engine, when the speed reaches the maximum value set for the turbo-compressor.

I claim:

1. A constant volume regulator for a motor driven turbo-compressor having an impeller and an intake for the compressor, said regulator comprising movable means for controlling the power delivered to the motor, said movable means being subjected to the difference in pressure due to the velocity of the fluid and existing between a point of relatively restricted section in the annulus of the impeller of the compressor and the pressure at another point of substantially full diameter in the intake of the compressor, whereby a substantially constant quantity of fluid is delivered to the intake of the compressor regardless of the discharge pressure.

2. A constant volume regulator for a motor driven turbo-compressor having an impeller and an intake for the compressor, said regulator comprising a receptacle, a bell shaped float within the said receptacle, operative connections actuated by said float for controlling the power delivered to the motor, means connecting the space within said float to a point of relatively restricted section in the intake of the compressor adjacent the impeller, and means connecting the portion of the receptacle above the float to a point of relatively larger diameter in the intake of the compressor within the compressor casing.

3. A constant volume regulator for a motor driven turbo-compressor, having an impeller and an intake for the compressor, said regulator comprising movable means for controlling the power delivered to the motor, the said movable means being subjected to the difference in pressure existing between two points of different diameter in the intake of the compressor within the compressor casing.

In testimony whereof I have signed this specification.

MELACH JOSEPH NUSIM.